US007747830B2

(12) United States Patent
Arakawa et al.

(10) Patent No.: US 7,747,830 B2
(45) Date of Patent: Jun. 29, 2010

(54) BACKUP SYSTEM WITH CONTINUOUS DATA PROTECTION

(75) Inventors: Hiroshi Arakawa, Sunnyvale, CA (US); Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 11/649,929

(22) Filed: Jan. 5, 2007

(65) Prior Publication Data

US 2008/0168218 A1 Jul. 10, 2008

(51) Int. Cl.
G06F 11/00 (2006.01)
G06F 12/00 (2006.01)
G06F 13/00 (2006.01)
G06F 13/28 (2006.01)

(52) U.S. Cl. .................. 711/161; 711/154; 711/162; 711/166; 714/5; 714/6

(58) Field of Classification Search .................. 711/161
See application file for complete search history.

(56) References Cited

U.S. PATENT DOCUMENTS

| 7,069,401 | B1* | 6/2006 | Noonan et al. ............ 711/162 |
|---|---|---|---|
| 2003/0093443 | A1* | 5/2003 | Huxoll ..................... 707/204 |
| 2004/0193945 | A1 | 9/2004 | Eguchi et al. |
| 2004/0268067 | A1 | 12/2004 | Yamagami |
| 2005/0022213 | A1 | 1/2005 | Yamagami |
| 2005/0154829 | A1* | 7/2005 | Maki et al. ............... 711/114 |
| 2005/0193031 | A1 | 9/2005 | Midgley et al. |

OTHER PUBLICATIONS

Revivio CPA http://www.revivio.com/. (Continuous Protection System, Ensuring business continuity with innovative data protection and rapid application recovery, p. 1).
Revivio CPA http://www.revivio.com/. (Michael Rowan, Continuous Data Protection, A technical overview, 2005, p. 1-8.
Revivio CPA http://www.revivio.com/ (Michel Fisher, Implementing Class A Disaster Recovery Programs Using Continuous Data Protection, 2005, p. 1-20.

* cited by examiner

*Primary Examiner*—Brian R Peugh
*Assistant Examiner*—Ryan Bertram
(74) *Attorney, Agent, or Firm*—Sughrue Mion, PLLC

(57) ABSTRACT

The system includes a host, a backup server, a storage system having a journaling capability described above and a media library system. The storage system makes snapshots for restoring with journal at predetermined intervals in accordance with established process. Moreover, in correspondence to an instruction of the 1st type from the backup server, the storage system generates a marker of the 1st type to make snapshot to be provided to the backup. The storage system makes and provides a snapshot to the backup server according to the process of the 1st intended marker. Then the backup server takes a backup data from the snapshot. Furthermore, in correspondence to an instruction of the 2nd type from the backup server, the storage system generates a marker of the 2nd type to stop replication in the storage system. The storage system provides a quiescence image of a volume according to the process of the 2nd intended marker. Then the backup server takes a backup data from the quiescence image.

2 Claims, 18 Drawing Sheets

| Consistency group ID | Journal (JNL) volume ID | Production volume ID | Sequence number | Status |
|---|---|---|---|---|
| 0 | 10 | 0, 2, 4 | 100 | Updating |
| 1 | 11, 12 | 1, 3, 5, 7 | 300 | Stop |
| : | | | | |

Fig. 3

| Production volume ID | Consistency group ID | Base volume | | Snapshot | | | | | | |
|---|---|---|---|---|---|---|---|---|---|---|
| | | Volume ID | Status | SS ID | Volume ID | Type | Time | Sequence number | Status | Address |
| 0 | 0 | 20 | Updating | 1 | 100 | ordinary | 2006/8/1 8:30:12.130000 | 1000 | Inaccessible | - |
| | | | | 2 | 201 | ordinary | 2006/8/1 16:30:00.000000 | 2000 | Inaccessible | - |
| | | | | 3 | 302 | ordinary | 2006/8/2 0:30:09.060000 | 3000 | Inaccessible | - |
| | | | | 4 | 404 | Specified | 2006/8/2 0:00:00.000000 | 2900 | Read and write is allowed | WWN-A, 50 |
| 1 | 1 | 31 | Stop | 1 | 500 | ordinary | 2006/8/1 0:00:00.000000 | 5000 | Inaccessible | - |
| | | | | 2 | 602 | ordinary | 2006/8/1 8:00:00.000000 | 6200 | Inaccessible | - |
| | | | | 3 | 704 | ordinary | 2006/8/1 16:00:00.000000 | 7500 | Inaccessible | - |
| : | | | | | | | | | | |

Fig. 4

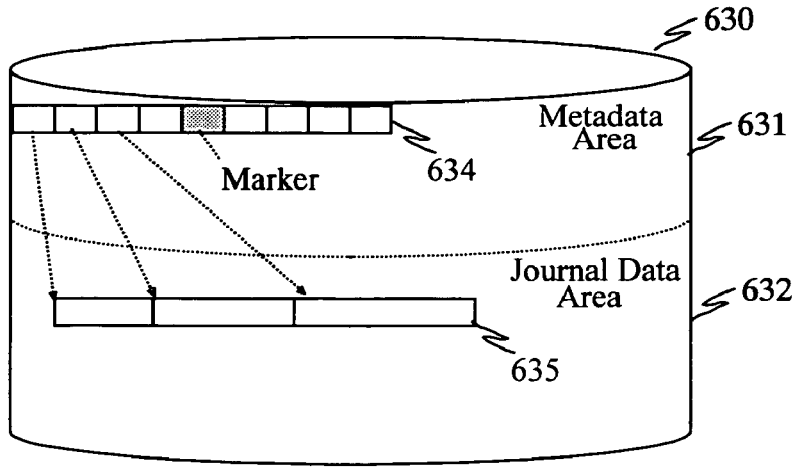

Fig. 5

| Consistency Group | 0 |
|---|---|
| SEQ# | 2900 |
| Time | 2006/8/2 0:00:00.000000 |
| System ID about journal volume | 10000 |
| Volume ID of metadata | 10 |
| Location of metadata (Address in volume) | 1700 |
| Volume ID of Journal data | 10 |
| Location of Journal data (Address in volume) | 6000 |
| System ID about production volume | 10000 |
| Production volume ID | 0 |
| Location in production volume (Address in production volume) | 7000 |
| System ID about base volume | 10000 |
| Base volume ID | 20 |
| Location in base volume (address in base volume) | 7000 |
| Data length | 262144 |
| Type | Normal |

Fig. 6

BACKUP SYSTEM WITH CONTINUOUS DATA PROTECTION

DESCRIPTION OF THE INVENTION

1. Field of the Invention

This invention generally relates to storage technology and more specifically to method and apparatus for backup and recovery of data.

2. Description of the Related Art

A typical and conventional method for achieving backup and recovery of data is to backup data periodically (e.g. once a day) from a storage system to backup media like magnetic tapes. In taking the backup data, a snapshot or a quiescence image of storage area (e.g. a volume) is often used to obtain data with consistency. That is, the data is read from a snapshot or a quiescence image and wrote to the backup media. Several methods to provide a snapshot of storage area logically or physically are well known as methods regarding storage systems. The data saved in the backup media is read and written to a new storage area (e.g. a new volume) when the data needs to be restored.

However, with the above method, it can only restore the image of the data at the time point of the snapshot or the quiescence image, and restoring data from backup data may lose some amount of updates because there is a difference between the saved data and current data. Moreover if the latest backup data has incorrect data actually, we have to use older backup data.

Recently, some storage systems have a capability of journaling and restoring data using the journal. With this capability, all updates for a storage area are recorded as a journal, and the data at an arbitrary time point can be restored by using the journal. In this journaling and restoring, snapshots may used. That is, besides the journal, snapshots of the storage area are maintained at predetermined intervals, and restoring the data at an arbitrary time point is achieved by applying the journal between time point of a snapshot and the time point to the snapshot. One method to provide this capability is disclosed in published U.S. patent application No. 2004/0268067A1.

Even if this journaling capability is used, the conventional backup method described above is needed because the capacity for storing journal (all updates) in a storage system has a limit actually. With a conventional method, snapshots for the conventional backup method and snapshots for restoring with journal are provided and managed separately. Therefore large amount of management cost and storage resources such volumes are required.

Therefore, what is needed is a way to reduce the management cost and the required storage resources.

SUMMARY OF THE INVENTION

The inventive methodology is directed to methods and systems that substantially obviate one or more of the above and other problems associated with conventional techniques for data backup and recovery.

In accordance with one aspect of the inventive concept, there is provided a computerized system including a host, a backup server, a storage system having a journaling capability; and a media library system. The storage system creates snapshots of data for subsequent restoration in conjunction with a journal, the backup server issues an instruction of a first type or an instruction of a second type. The storage system detects the instruction of the first type that causes the storage system to generate a marker of the first type causing a snapshot to be provided to the backup server or the instruction of the second type that causes the storage system to generate a marker of a second type causing a quiescence image of a volume to be provided to the backup server by discontinuing replication. Upon receiving the snapshot or the quiescence image of a volume from the storage system, the backup server takes a backup of the received snapshot or the quiescence image.

In accordance with another aspect of the inventive concept, there is provided a computerized system including a host, a backup server, a storage system having a journaling capability; and a media library system. The storage system creates periodic snapshots of data for subsequent restoration in conjunction with a journal and the backup server or the host issues an instruction of a third type. In response to the instruction of the third type, the storage system generates a marker of a third type causing multiple snapshots to be generated and restores point in time image of data using the generated multiple snapshots and journal data.

In accordance with yet another aspect of the inventive concept, there is provided a method executed in a system comprising a backup server, an array controller and an agent on a host. The inventive method involves the backup server preparing for backup process in cooperation with the agent; the agent collecting information regarding target data for backup; the backup server issuing a command to define a time point of snapshot with indication of target of the snapshot; the array controller receiving the command; the array controller specifying a target of the snapshot by referring the command; the array controller making a marker to take the snapshot based on the command; the array controller detecting the marker in updating base volume with journal and the array controller checking the information in the marker. If the type of the maker corresponds to snapshot, a backup process is performed using the snapshot. If the type of the marker corresponds to quiescence, a backup process is performed using the quiescent image. If the marker is of other type, a process intended by the marker is performed.

In accordance with further aspect of the inventive concept, there is provided a storage system having a journaling capability. In the inventive storage system creates snapshots of data for subsequent restoration in conjunction with a journal and detects an instruction of the first type that causes the storage system to generate a marker of the first type causing a snapshot to be provided to a computer or an instruction of the second type that causes the storage system to generate a marker of a second type causing a quiescence image of a volume to be provided to a computer by discontinuing replication.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 3 illustrates exemplary consistency group information.

FIG. 4 illustrates exemplary volume information.

FIG. 5 illustrates exemplary method of storing journal in Journal volume.

FIG. 6 illustrates exemplary contents of a metadata.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In this invention, markers, i.e. special types of journal, are used to provide snapshot to be used to take backup or to restore the data with journal. Moreover this invention also discloses other type of markers to achieve rapid restore with journal as a method for an effective usage of snapshot. This method achieves shorter restore time than the restore time of the conventional method.

A. First Embodiment

A.1. System Configuration

Figure 1:
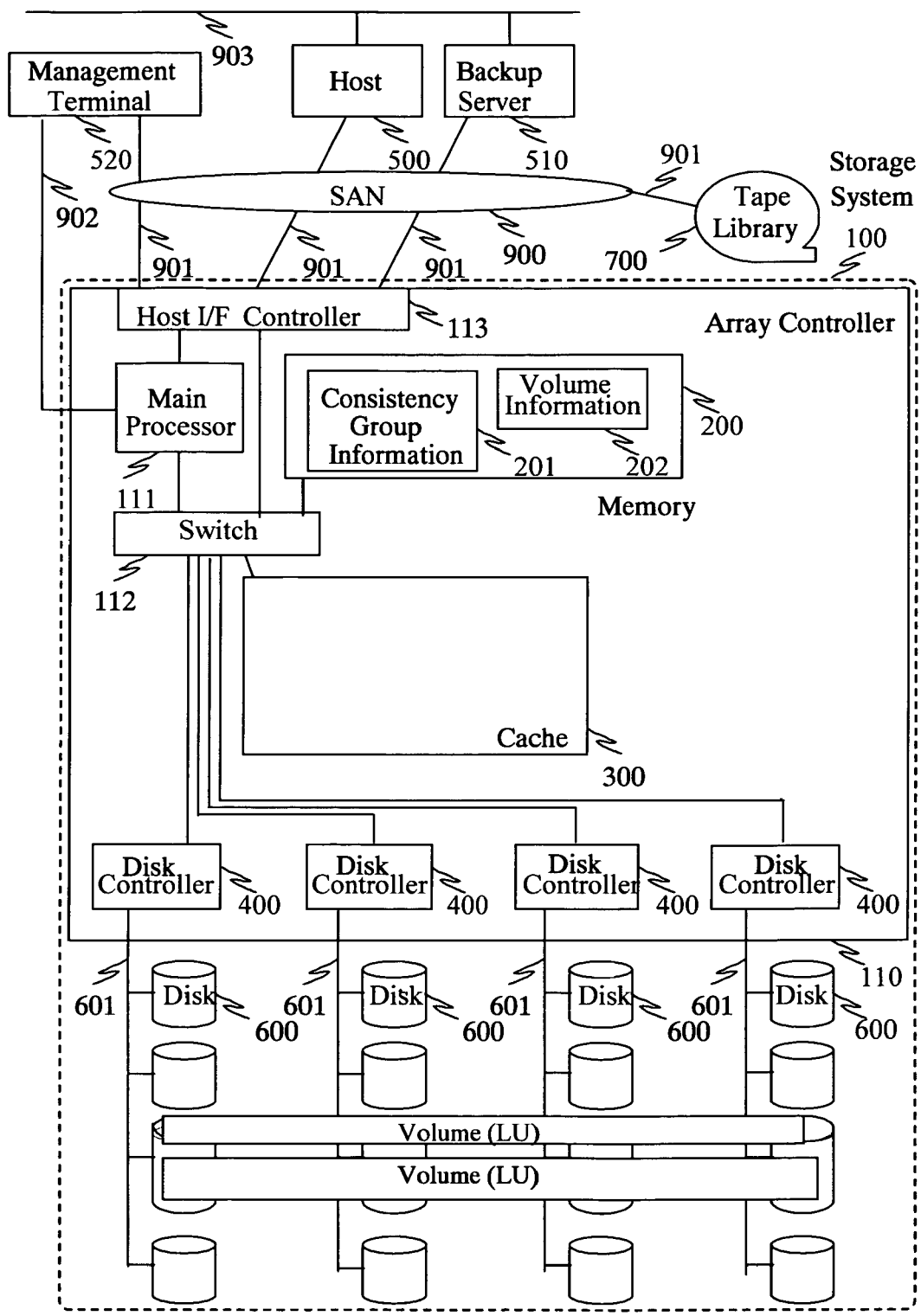
FIG. 1 illustrates exemplary system configuration of the first embodiment.

FIG. 1 illustrates the system configuration of the first embodiment of the inventive concept. The storage system in accordance with an embodiment of the invention includes storage system 100, array controller 110, main processor 111, switch 112, host interface 113, memory 200, cache 300, disk controller 400, disk (e.g. HDD) 600, backend path (e.g. Fibre Channel, SATA, SAS, iSCSI(IP)) 601. The main processor 101 performs various processes regarding Array controller 100.

The main processor 101 and other system components use information stored in the memory 200, including consistency group information 201 and volume information 202. Host 500, backup server 510 and management terminal 520 are connected to host interface 113 and Tape library 700 via SAN 901 (e.g. Fibre Channel, iSCSI(IP)).

Host 500, backup server 510 and management terminal 520 are interconnected via LAN 903. Management terminal 520 is also connected to array controller 100 via out-of-band Network 902 (e.g. IP).

Volumes (Logical Units) provided by Storage system 100 are produced from collection of areas in HDDs. They may be protected by storing parity code (i.e. by RAID configuration).

A.2. Basic Process of Journaling

Figure 2:
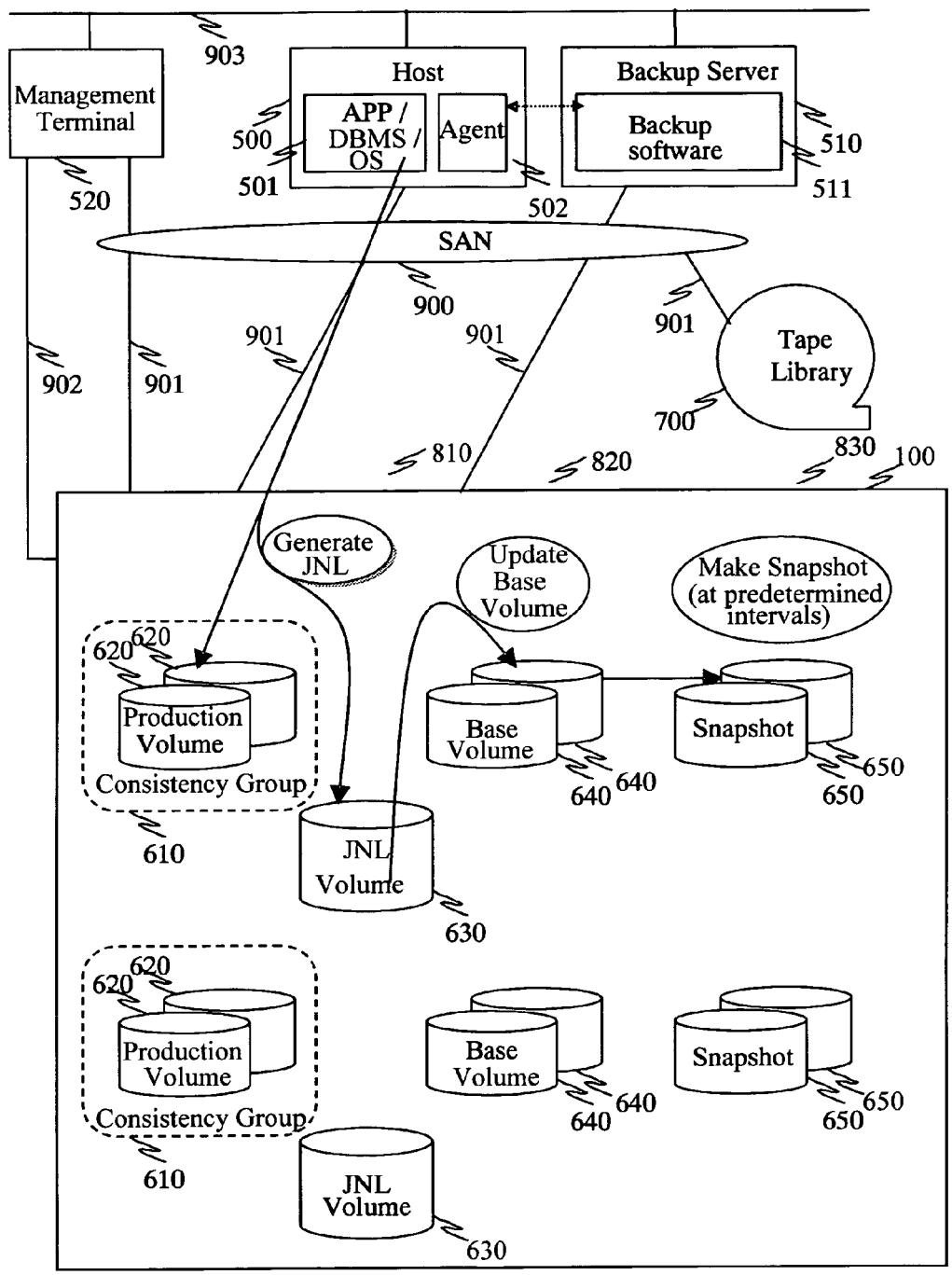
FIG. 2 illustrates exemplary journaling process.

FIG. 2 illustrates a basic process of journaling. In this figure, host 500 includes software 501, which may be application software, DBMS and OS. Agent software 502 is also located in host 500 and works in cooperation with Backup software 511 on Backup server 510 via LAN 903.

Software 501 stores data to production volumes 620 provided by Storage system 100. Storage system 100 also has Base volumes 640 that constitute a pair with Production volume 620. Base volume 640 has a replica data of paired Production volume 620 and receives same update of the Production volume 620 as described below.

Production volumes 620 constitute consistency group 610. Generate journal (JNL) function 810 in Storage system 100 obtains data that is transferred to update Production volumes 620, assigns sequence number (incremental number) to journal per each Consistency group 610, and records as journal on Journal volumes 630 that are assigned for each Consistency group 610. Consistency group information 201 described in FIG. 3 includes information about each consistency group and relation between Production volume 620 and Journal volume 630. Volume information 202 described in FIG. 4 includes information about relation between Production volume 620 and Base volume 640.

FIG. 5 discloses method of storing journal in Journal volume 630. Journal volume 630 is divided into two areas: Metadata area 631 and Journal data area 632. Generate JNL function 810 stores update data to Journal data area 632 as Journal data 635. Then Generate JNL function 810 generates information with fixed length (Metadata 634) for each journal, recodes the location of the journal data 635 on the Metadata 634 and stores the Metadata 634 in Metadata area 631. FIG. 6 shows an example of contents of a Metadata 634. Metadata 634 has several types like "Normal", "Snapshot Marker: Make snapshot" and "Snapshot Marker: Quiescence" as described later.

In FIG. 2, update base volume function 820 in Storage system 100 reads metadata, acquires journal data, and updates Base volume 640 with the journal data according to the sequence number.

Moreover Make snapshot function 830 in Storage system 100 obtains snapshot of each Base volume 640 at predetermined intervals and updates Volume information 202. As described in FIG. 4, Volume information 202 has information about snapshots. Make snapshot function 830 recodes time and sequence number of journal corresponding to snapshot on Volume information 202. Time attached to Metadata 634 and recorded in Volume information 202 are attached by Storage controller 110 as received time or attached by Host 500 as write time.

A.3. Basic Process of Restoring Data by Journal

Figure 7:
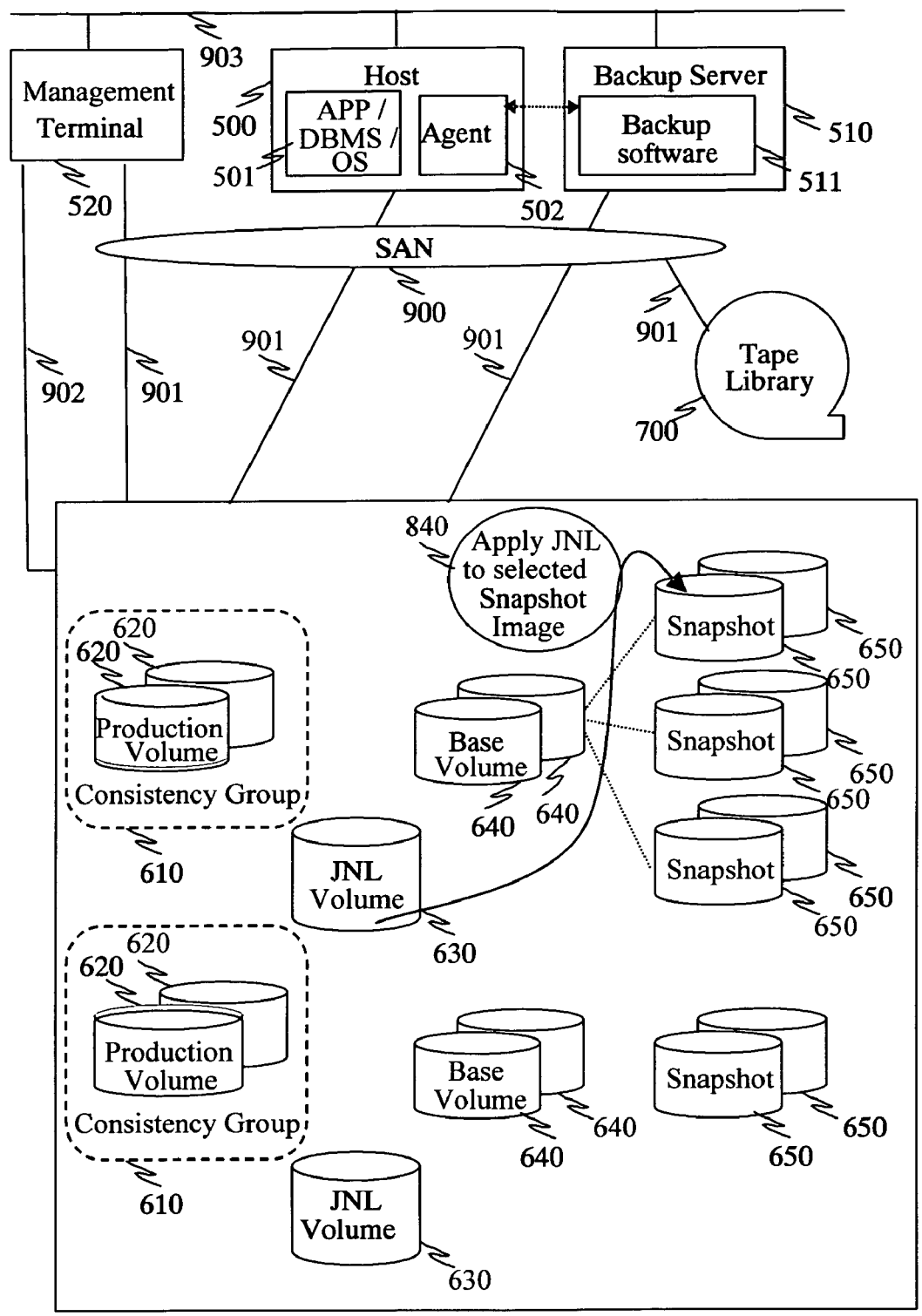
FIG. 7 illustrates exemplary process for restoring data using journal.

FIG. 7 describes a basic process of restoring data by using journal. First, Host 500 instructs restoring data with indicating a point in time to be restored. According to the instruction including indication of the data and the point in time, Apply journal function 840 selects a snapshot that has the data before the point in time.

Moreover Apply journal function 840 applies (writes) journal from the journal corresponding the selected snapshot to the journal corresponding the indicated point in time according to the sequence number in the Metadata 634. The nearest snapshot for the target point in time should be selected to make amount of journal to be applied smallest. Apply journal function 840 can recognize journal to be applied by referring Volume information 202. After completion of applying the journal, Apply journal function 840 changes status of the snapshot to accessible (read/write access is allowed).

Figure 8:
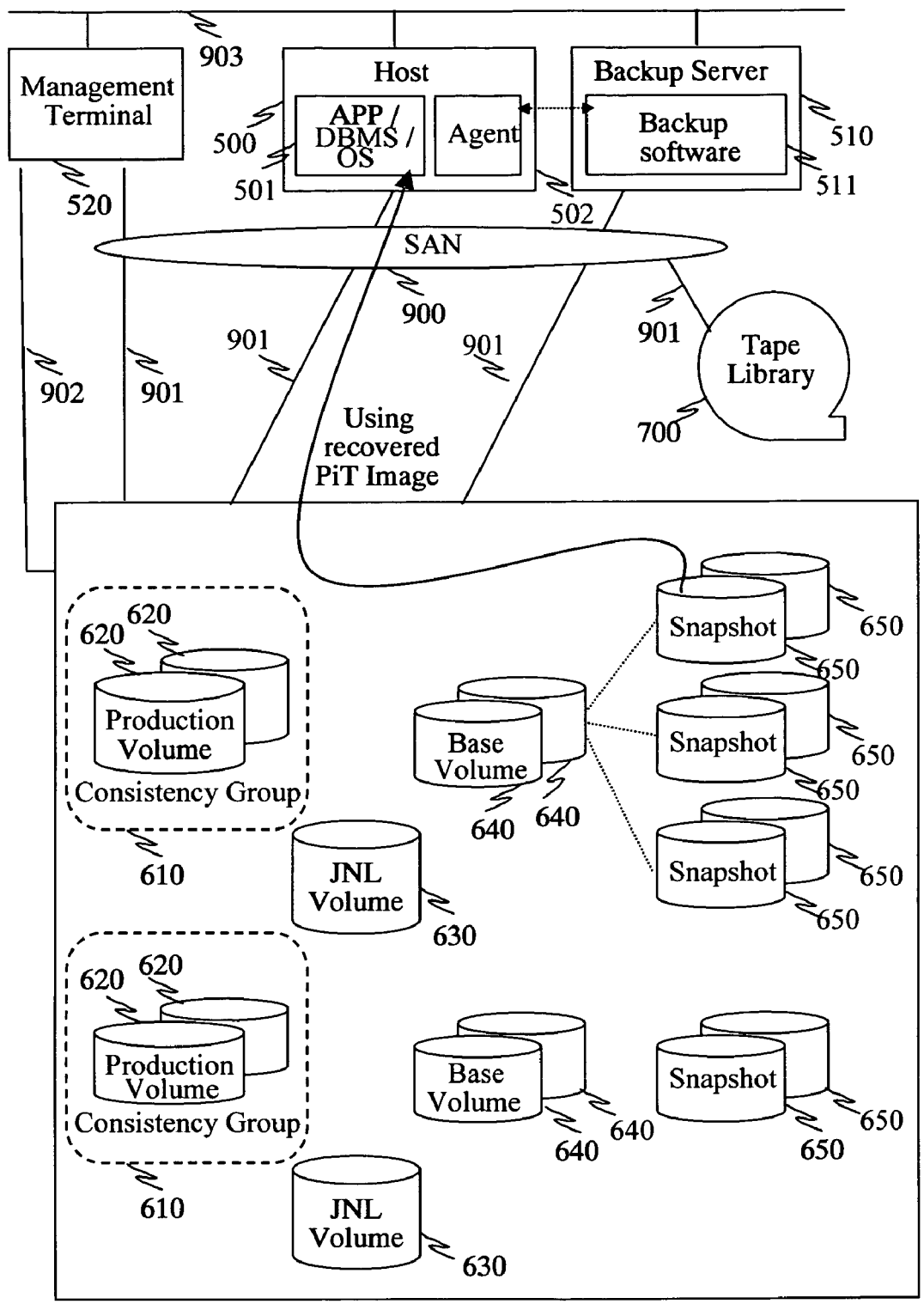
FIG. 8 illustrates exemplary process for recovering point in time (PiT) image of the data.

Then, as described in FIG. 8, host 500 can use the recovered point in time (PiT) image of the data.

A.4. Process of Instruction of Making Snapshot

Figure 9:
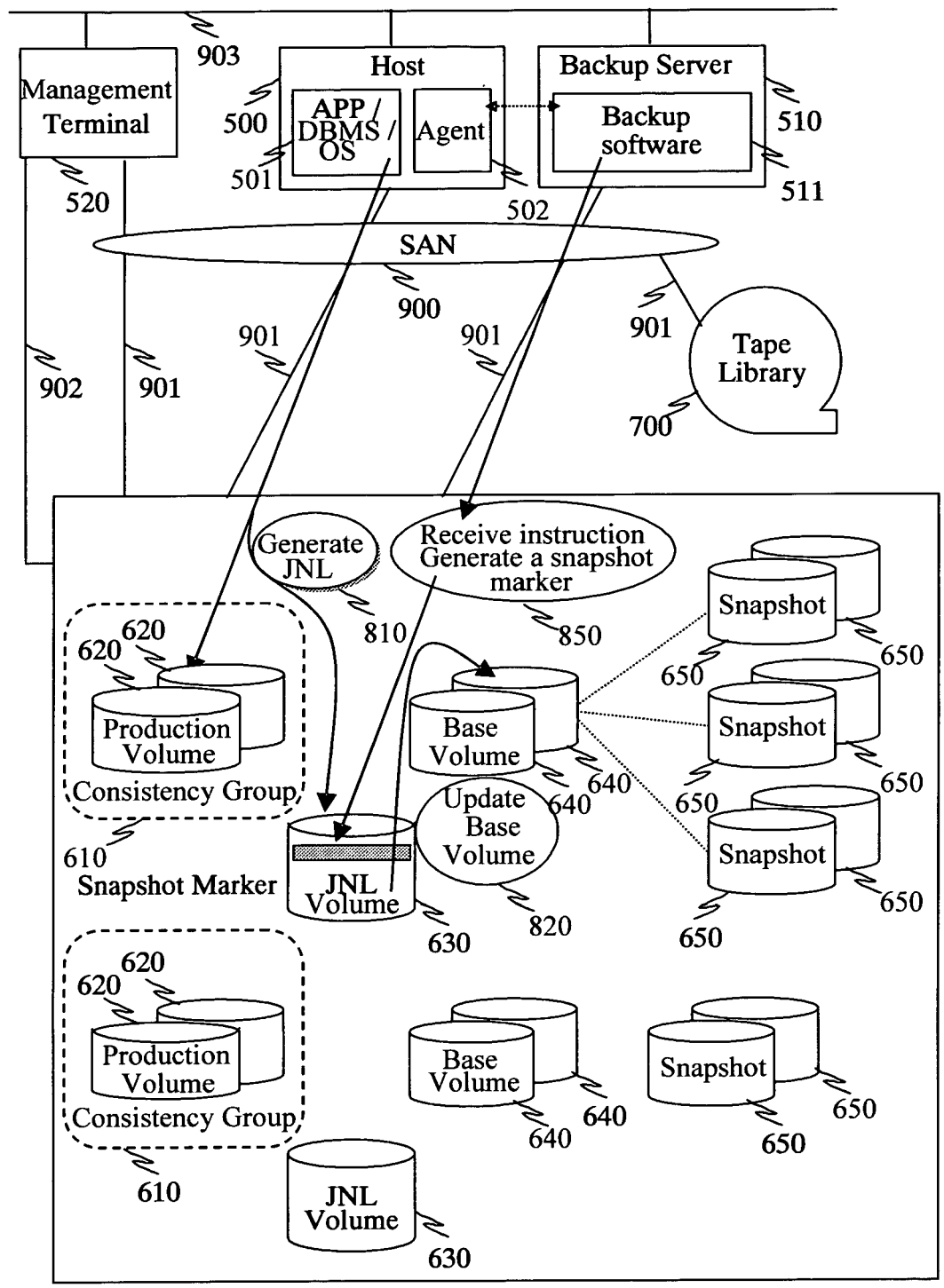
FIG. 9 illustrates exemplary process for making a marker to generate a snapshot based on instruction for backup operation.

FIG. 9 describes a process of making a marker to generate a snapshot based on instruction for backup operation. First, Backup software 511 on Backup server 510 determines a point in time for getting backup data and issues a instruction including indication of the target data and the point in time. By receiving the instruction, Generate a snapshot maker function 850 makes a special metadata of journal (marker). The marker is a metadata that has time information, sequence number and special type to make snapshot or Quiescence Image (e.g. "Snapshot Marker: Make snapshot" or "Snapshot Marker: Quiescence").

A.5. Process of Making Snapshot

Figure 10:
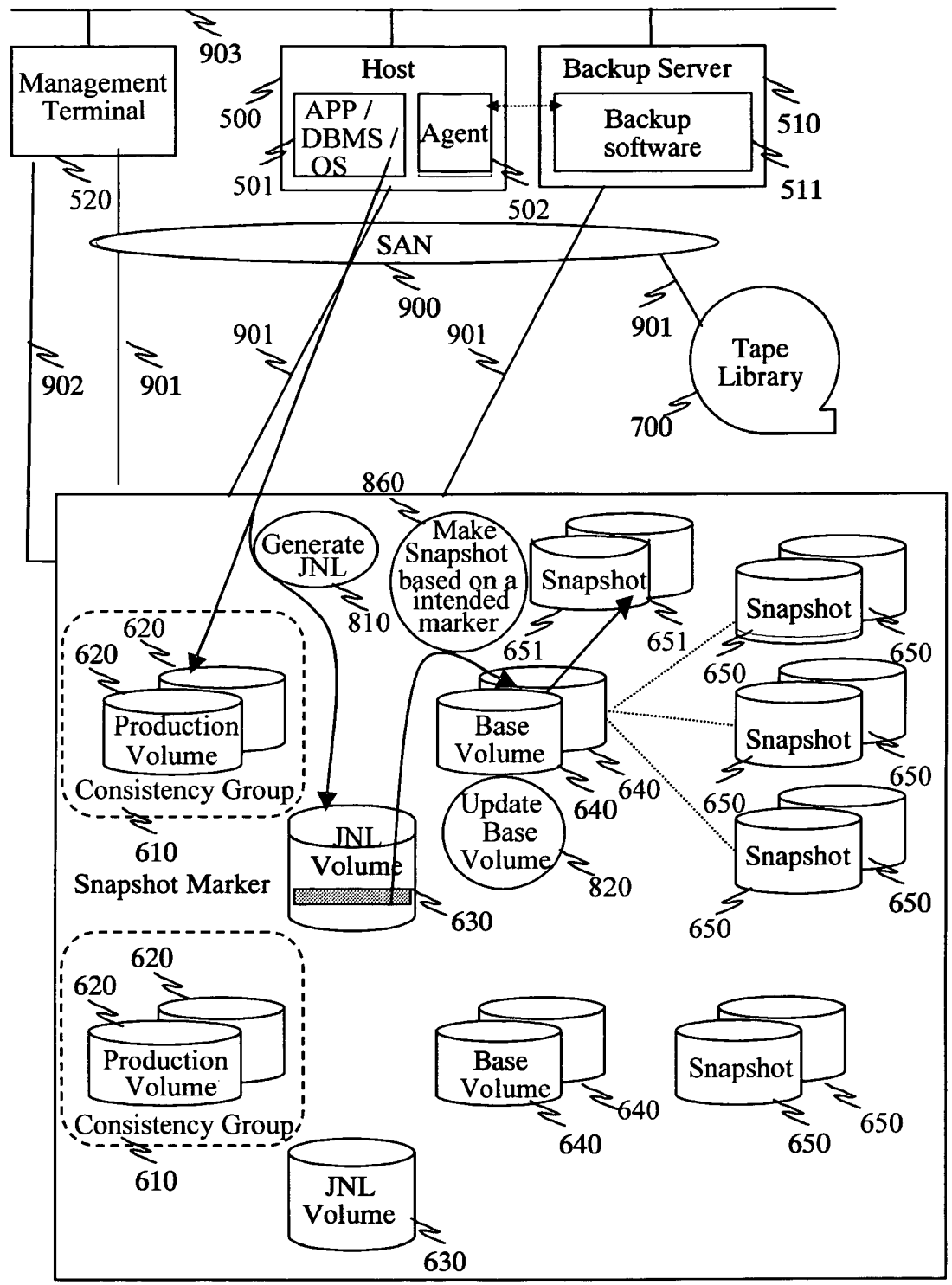
FIG. 10 illustrates exemplary process for making a snapshot.

FIG. 10 describes a process for making a snapshot. When Update base volume function 820 detects the maker to make snapshot ("Snapshot Marker: Make snapshot") in journal, Make snapshot function 860 makes a snapshot of the time point corresponding to the marker (Snapshot 651 in FIG. 10). Then Make snapshot function 860 updates Volume information 202 for the snapshot 651 (i.e. adds a new entry in Volume information 202). After completion of making the Snapshot 651, Make snapshot function 860 changes status of the snapshot to accessible (read/write access is allowed). This step may include assigning path to access.

Figure 11:
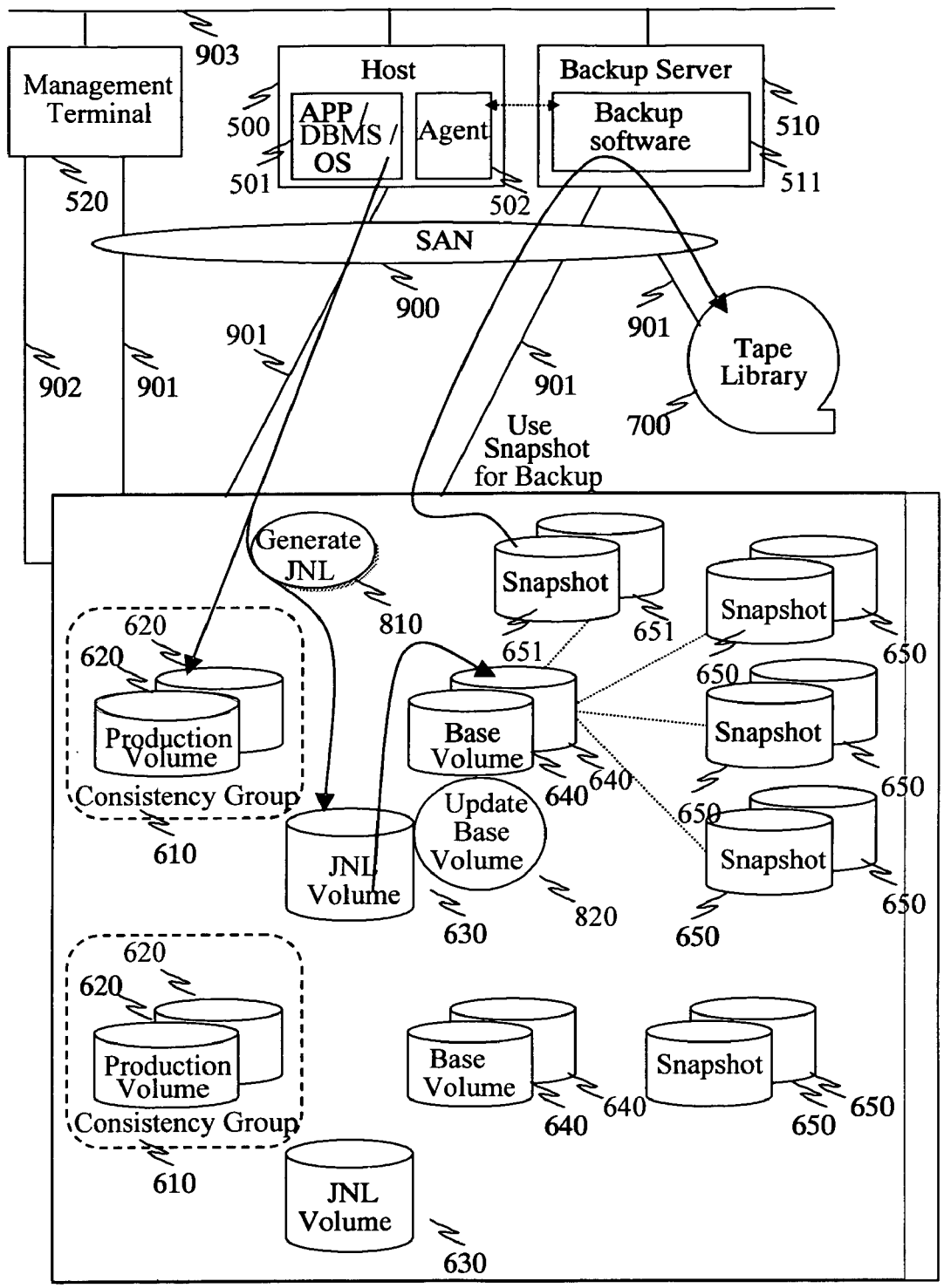
FIG. 11 illustrates obtaining backup data using snapshot.

Then, as described in FIG. 11, backup software 510 can use the snapshot 651 to obtain backup data. Backup software 510 can transfer data from the snapshot 651 to tape library 700.

As described above, making the snapshot is asynchronous to the instruction to making the marker.

A.6. Process of Instruction of Quiescence

Figure 12:
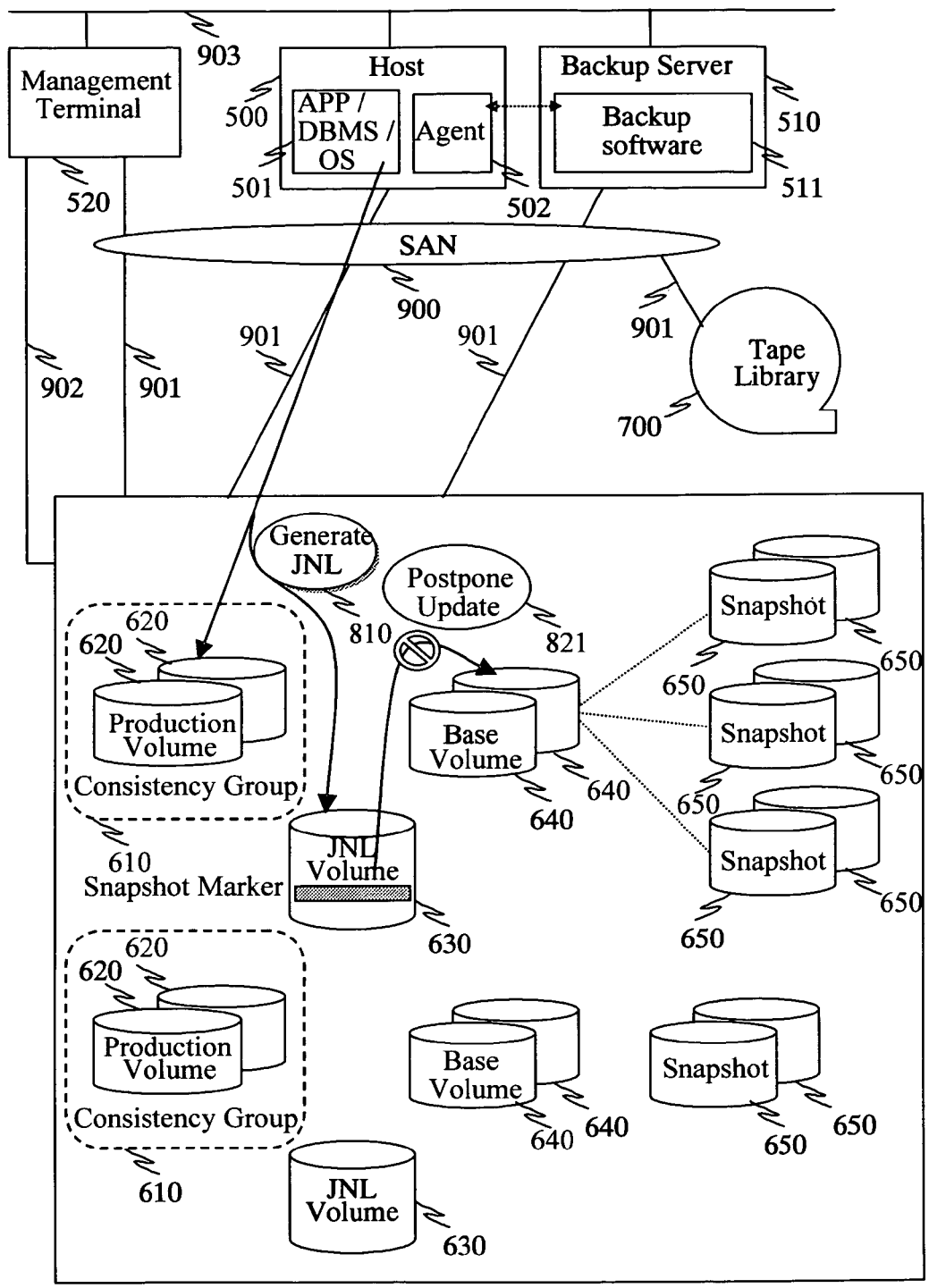
FIG. 12 illustrates exemplary process for quiescence.

FIG. 12 describes a process for quiescence. When Update base volume function 820 detects the maker for quiescence ("Snapshot Marker: Quiescence") in journal, Update base volume function 820 postpones update of Base volume 640. That is, base volume has a quiescence image. Next, Postpone function 821 changes status of the Base volume 640 to accessible (read/write access is allowed). This step may include assigning path to access.

Figure 13:
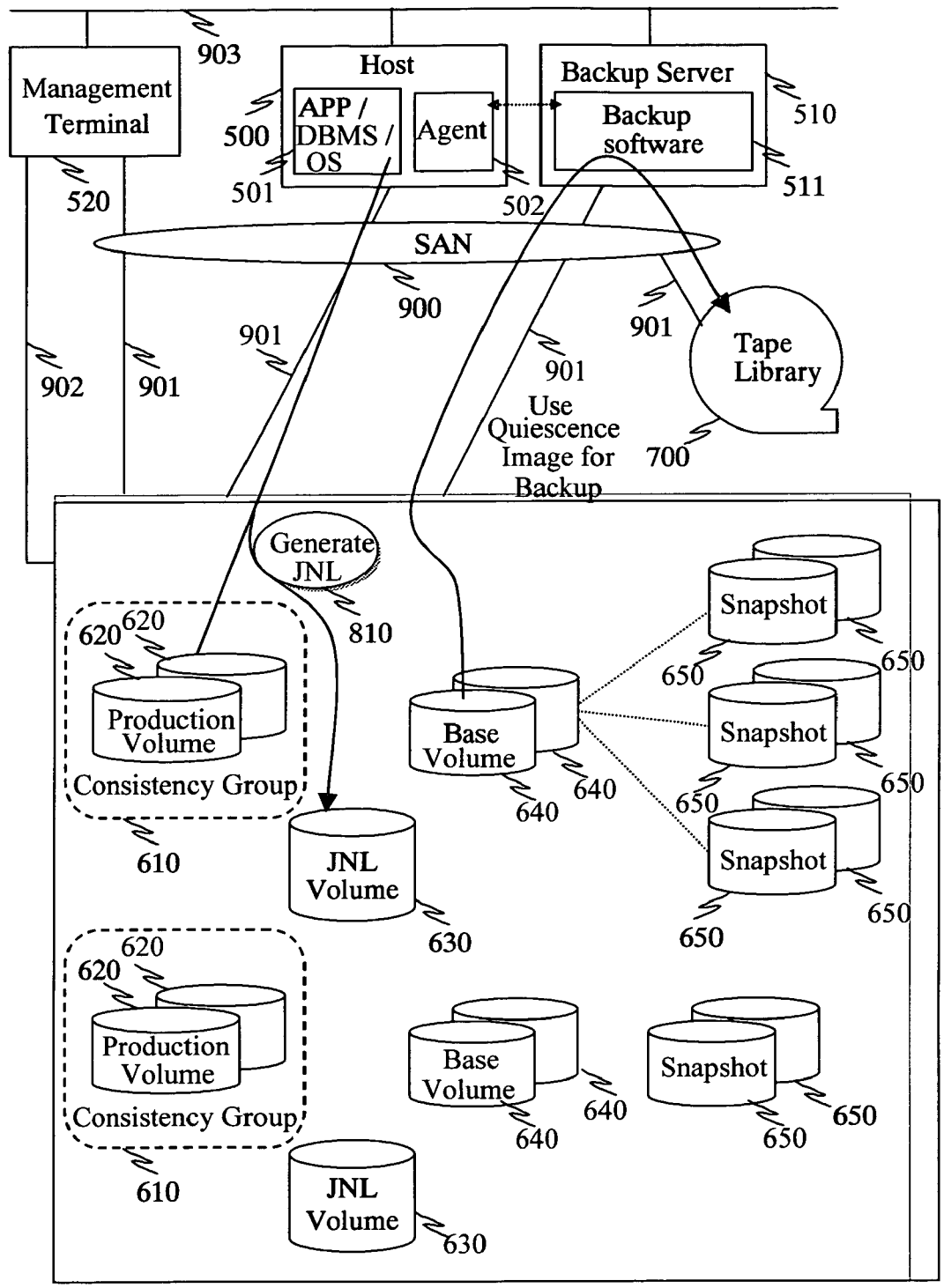
FIG. 13 illustrates obtaining backup data using quiescent base volume.

Then, as described in FIG. 13, backup software 510 can use the quiescent base volume 640 to obtain backup data. Backup software 510 can transfer data from base volume 640 to the tape library 700.

Figure 14:
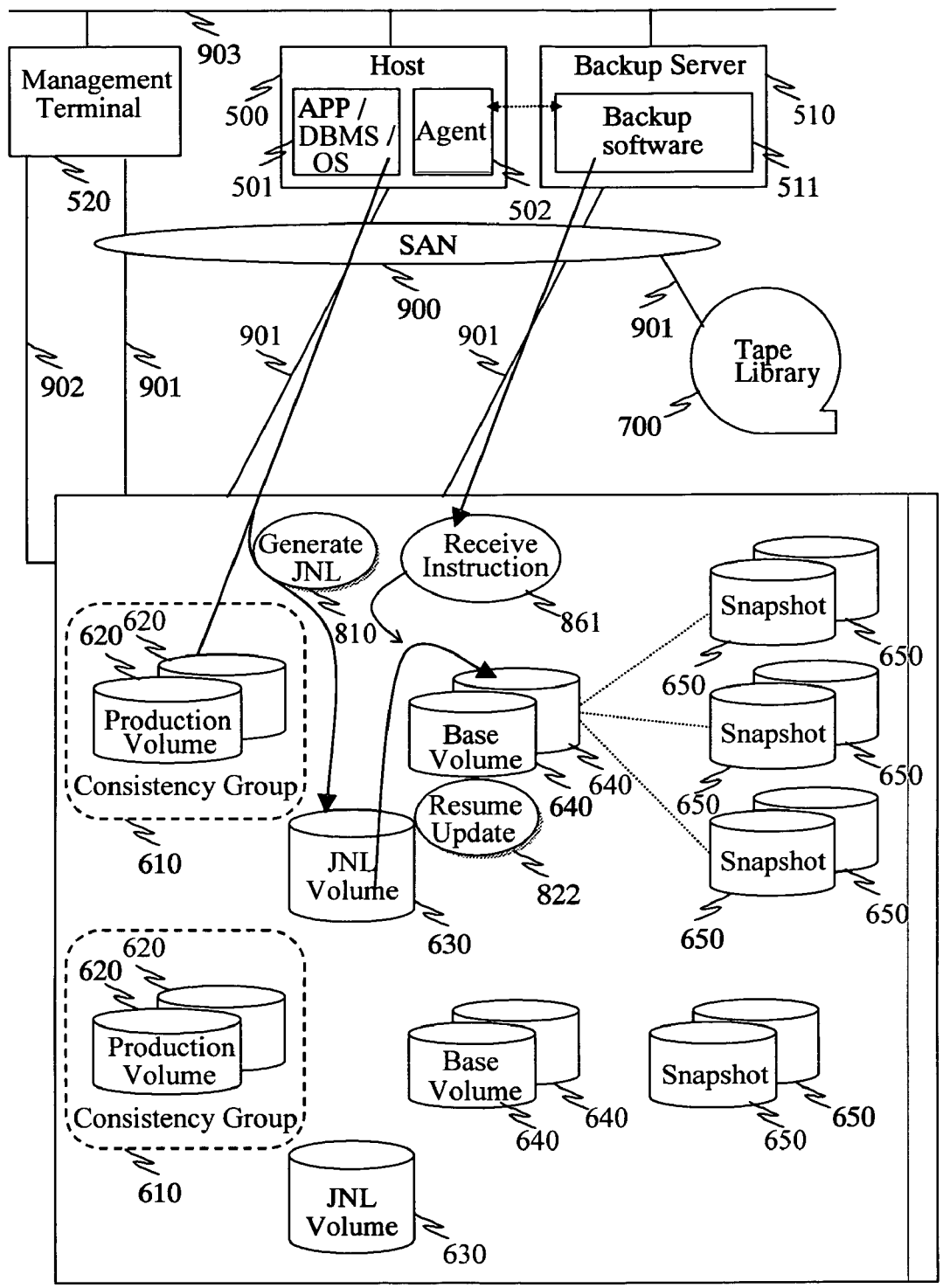
FIG. 14 illustrates exemplary process for resuming update of Base volume.

FIG. 14 shows a process of resuming update of Base volume 650. According to a instruction from Backup software 511 in order to resuming update, Resume function 822 changes status of the Base volume 640 to inaccessible (read/write access is not allowed). Then Update base volume function 820 resumes update of Base volume 640. While the update of Base volume 640 is postponed (stopped), generated journal are stored in Journal volume 630.

As described above, getting the quiescence image is asynchronous to the instruction to making the marker.

A.7. Process for Backup Operation

Figure 15:
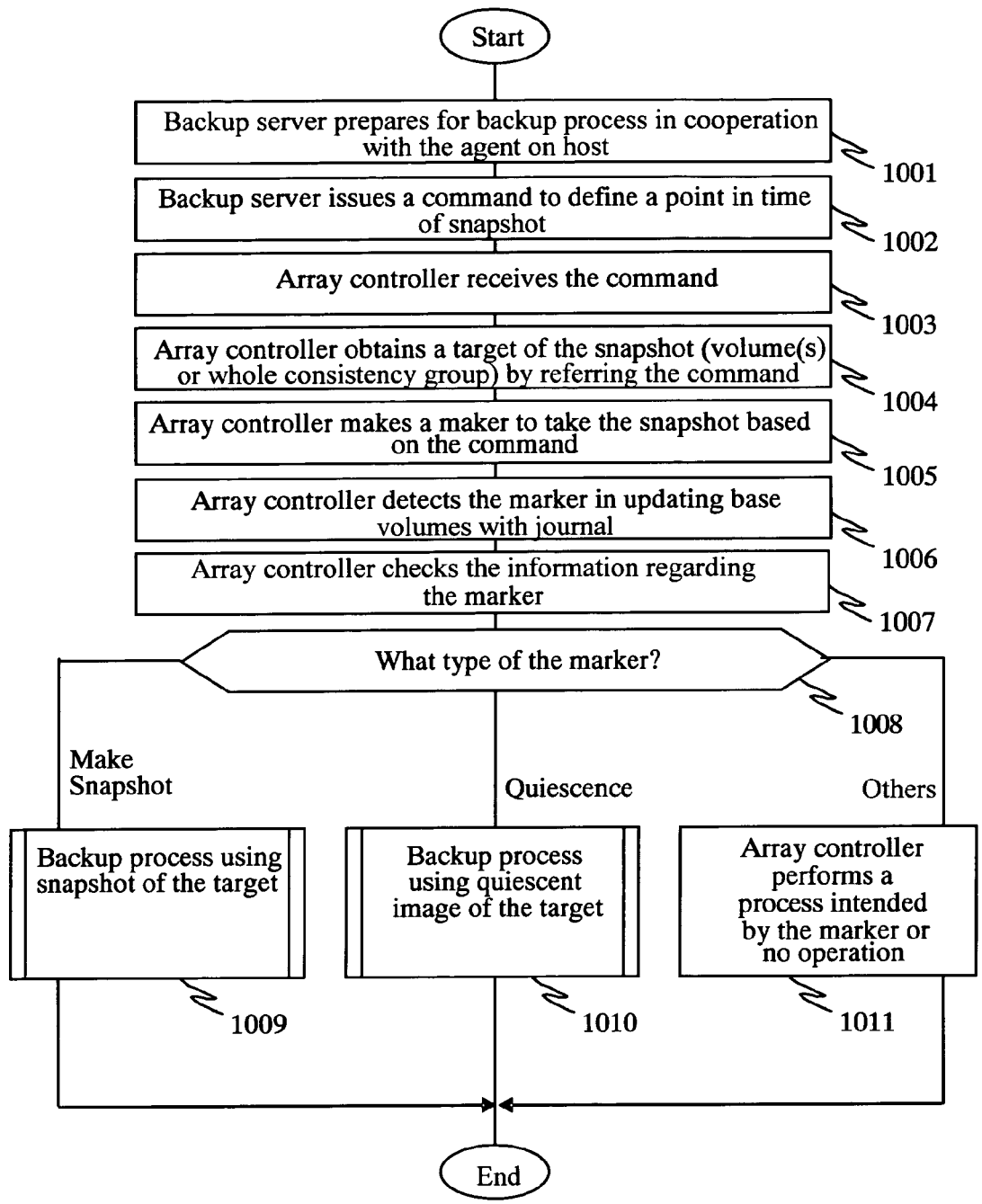
FIG. 15 illustrates exemplary process for backup operation.

FIG. 15 shows process for backup operation mentioned above.

At step 1001, Backup server 510 prepares for backup process in cooperation with Agent 502 on Host 500. Agent 502 checks status of Software 501 and collects information regarding target data of backup.

At step 1002, Backup server 510 issues a command to define a time point of snapshot with indication of target of the snapshot.

At step 1003, Array controller 110 receives the command.

At step 1004, Array controller 110 specifies a target of the snapshot (volume(s) or whole consistency group) by referring the command.

At step 1005, Array controller 110 makes a marker to take the snapshot based on the command.

At step 1006, Array controller 110 detects the marker in updating Base volume 640 with journal.

At step 1007, Array controller 110 checks the information in the marker.

At step 1008, if the type of the maker is "Make snapshot", the process proceeds to step 1009. If the type of the marker is "Quiescence", the process proceeds to step 1010. If the type of the maker is others, the process proceeds to step 1011.

At step 1009, backup using the snapshot is performed. Detailed process of this step is described later.

At step 1010, backup using quiescent image of the target is performed. Detailed process of this step is described later.

At step 1011, Array controller 110 performs a process intended by the marker or no operation.

Figure 16:
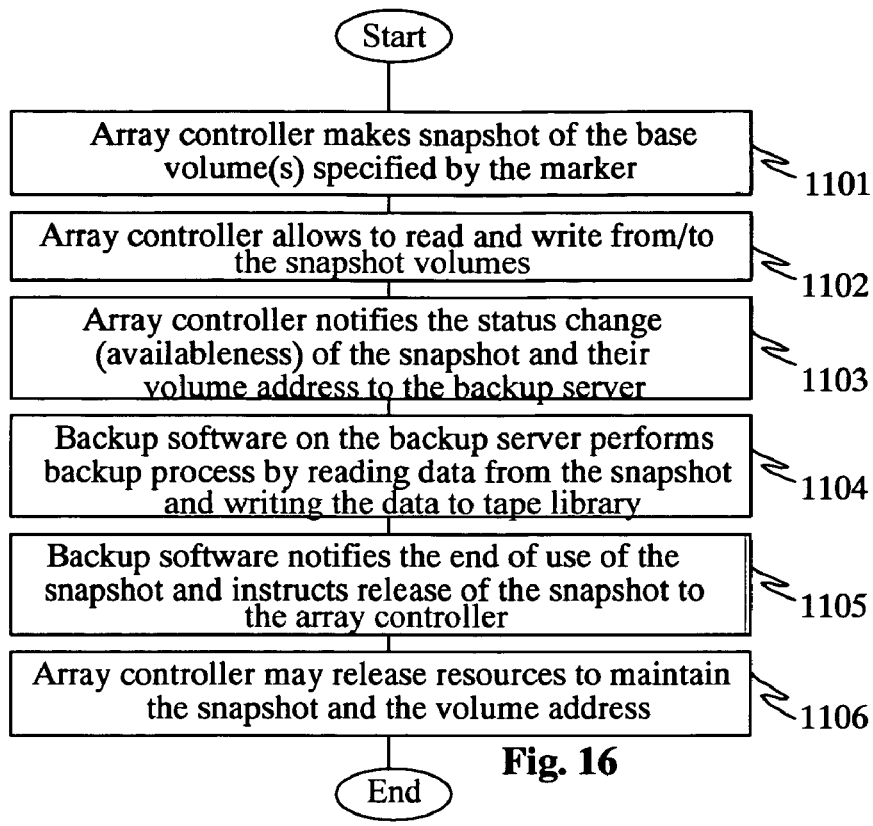
FIG. 16 illustrates exemplary backup process using snapshot.

FIG. 16 shows backup process using snapshot mentioned above.

At step 1101, Array controller 110 makes snapshot of the base volume(s) specified by the marker.

At step 1102, Array controller 110 allows to read and write from/to the snapshot volumes.

At step 1103, Array controller notifies the status change (availableness) of the snapshot and their volume address to Backup server 510.

At step 1104, Backup software 511 on the Backup server 510 performs backup process by reading data from the snapshot and writing the data to Tape library 700.

At step 1105, Backup software 511 notifies the end of use of the snapshot and instructs release of the snapshot to Array controller 110.

At step 1106, Array controller 110 may release resource for maintaining the snapshot and the volume address.

As another example of the procedure, volume address of the snapshot can be predetermined and known by Backup server 510.

Figure 17:
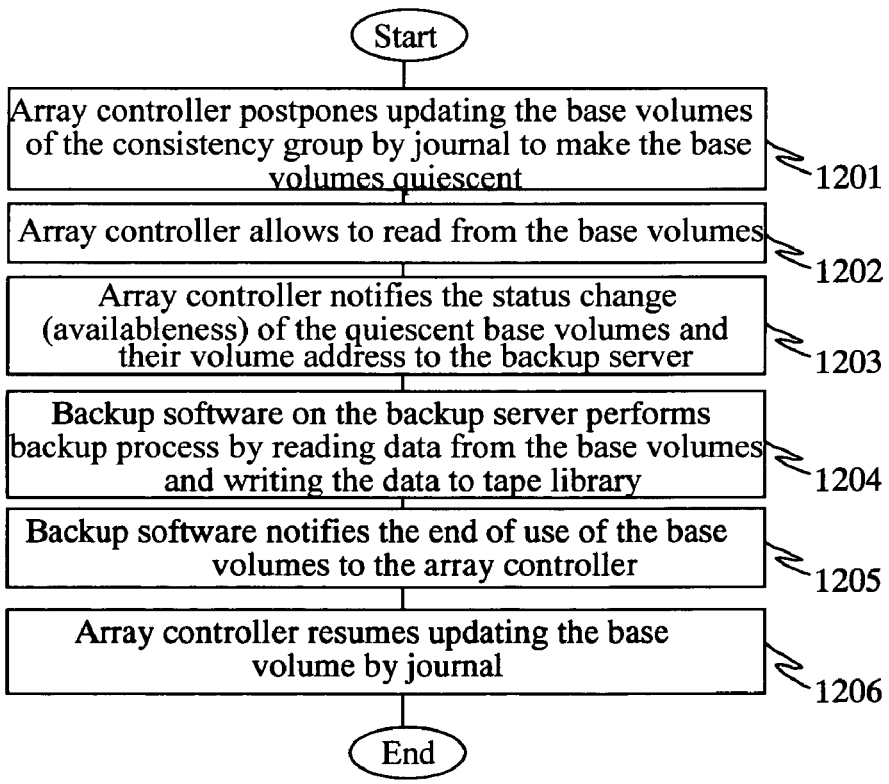
FIG. 17 illustrates exemplary backup process using quiescent image.

FIG. 17 shows backup process using quiescent image mentioned above.

At step 1201, Array controller 110 postpones updating the Base volumes 640 of the Consistency group 610 by journal to make the Base volumes 640 quiescent.

At step 1202, Array controller 110 allows to read and write from/to the Base volumes 640.

At step 1203, Array controller notifies the status change (availableness) of the quiescent Base volume 640 and their volume address to Backup server 510.

At step 1204, Backup software 511 on the Backup server 510 performs backup process by reading data from the Base volume 640 and writing the data to Tape library 700.

At step 1205, Backup software 511 notifies the end of use of the Base volume 640 to Array controller 110.

At step 1206, Array controller 110 resumes updating the Base volume 640 by journal.

B. Second Embodiment

Figure 18:
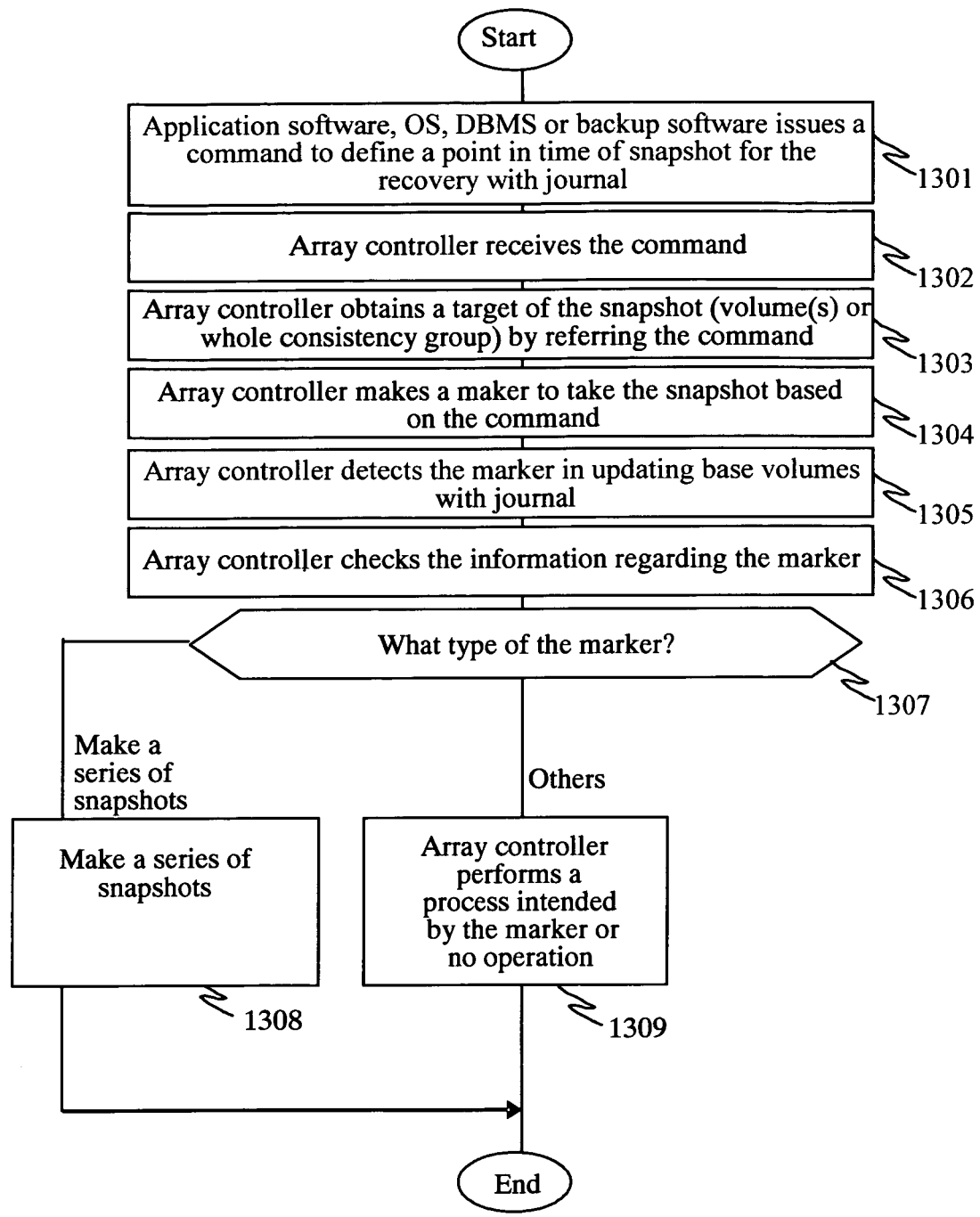
FIG. 18 illustrates an alternative usage of a maker.

FIG. 18 describes another usage of maker. By indicating point in time for recovering data in advance by Software 501 or Backup software 511, quick restoring of the data by applying journal is achieved even if final time point for restoring is vague at that time and retry of restoring will be needed.

At step 1301, Software 501 or Backup software 511 issues a command to define a point in time of snapshot for the recovery with indication of target of the snapshot.

At step 1302, Array controller 110 receives the command.

At step 1303, Array controller 110 obtains a target of the snapshot (volume(s) or whole consistency group) by referring the command.

At step 1304, Array controller 110 makes a marker to take the snapshot based on the command.

At step 1305, Array controller 110 detects the marker in updating Base volume 640 with journal.

At step 1306, Array controller 110 checks the information regarding the marker.

At step 1307, if the type of the maker is "Make a series of snapshots", the process proceeds to step 1308. If the type of the maker is others, the process proceeds to step 1309.

At step 1308, Array controller 110 makes a series of snapshots. In this step, multiple snapshots (a series of snapshots) are made in short interval like one or ten minutes.

At step 1309, Array controller 110 performs a process intended by the marker or no operation.

In the basic process of restoring data by using journal described above with FIG. 7, the series of snapshot made by above method is beneficial because this can decrease amount of journal to be applied and achieve reducing time for recovering process.

C. Third Embodiment

Figure 19:
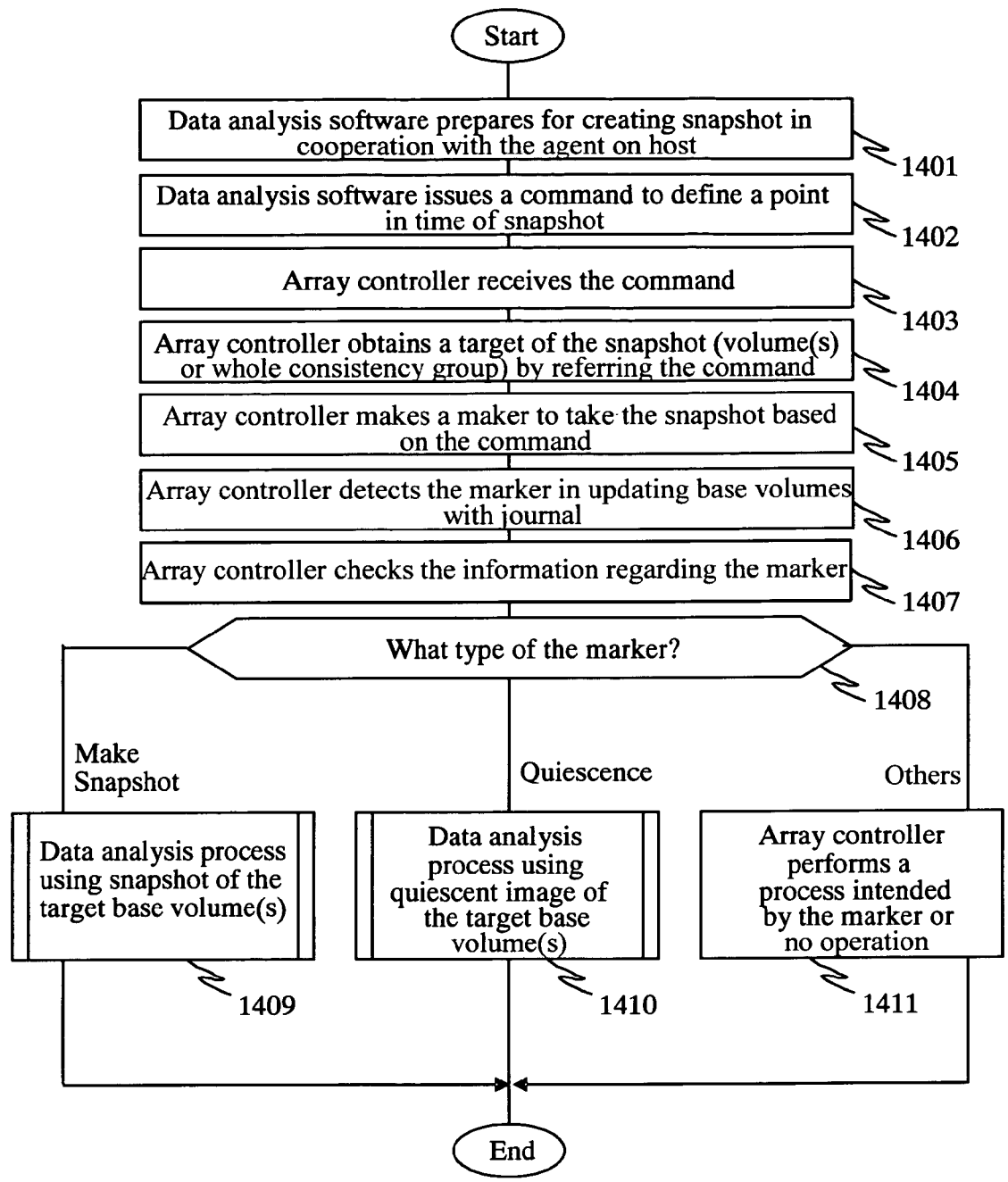
FIG. 19 illustrates alternative usage of snapshot and quiescence image based on maker.

FIG. 19 describes another usage of snapshot and quiescence image based on maker. Data analysis software could be data warehouse software or business intelligence software (not shown in figure) on Host 500 can use snapshot and quiescence image mentioned above instead of Backup software 511.

D. Computer System

Figure 20:
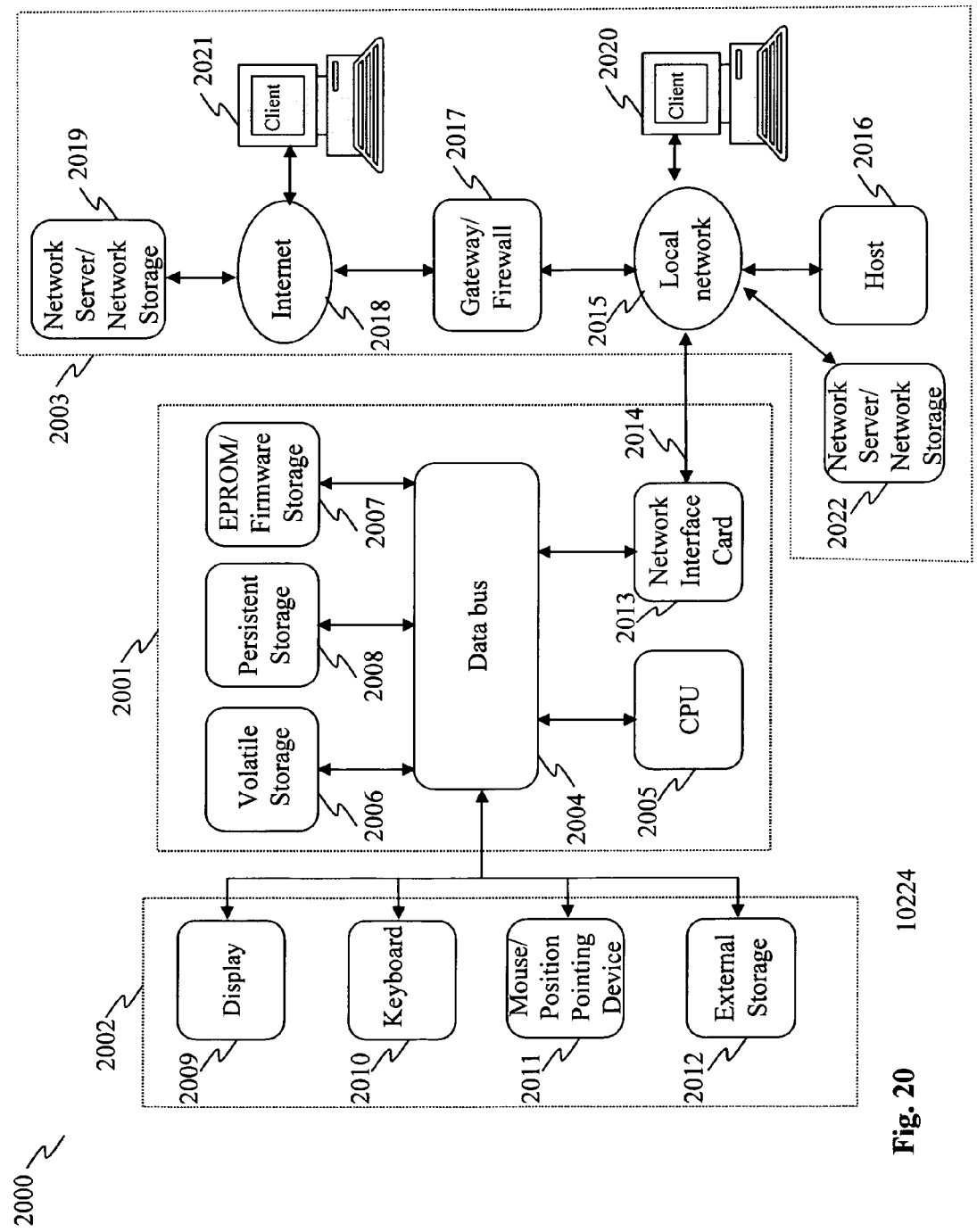
FIG. 20 illustrates an exemplary embodiment of a computer platform upon which the inventive system may be implemented.

FIG. 20 is a block diagram that illustrates an embodiment of a computer/server system 2000 upon which an embodiment of the inventive methodology may be implemented. The system 2000 includes a computer/server platform 2001, peripheral devices 2002 and network resources 2003.

The computer platform 2001 may include a data bus 2004 or other communication mechanism for communicating information across and among various parts of the computer platform 2001, and a processor 2005 coupled with bus 2001 for processing information and performing other computational and control tasks. Computer platform 2001 also includes a volatile storage 2006, such as a random access memory (RAM) or other dynamic storage device, coupled to bus 2004 for storing various information as well as instructions to be executed by processor 2005. The volatile storage 2006 also may be used for storing temporary variables or other intermediate information during execution of instructions by processor 2005. Computer platform 2001 may further include a read only memory (ROM or EPROM) 2007 or other static storage device coupled to bus 2004 for storing static information and instructions for processor 2005, such as basic input-output system (BIOS), as well as various system configuration parameters. A persistent storage device 2008, such as a magnetic disk, optical disk, or solid-state flash memory device is provided and coupled to bus 2001 for storing information and instructions.

Computer platform 2001 may be coupled via bus 2004 to a display 2009, such as a cathode ray tube (CRT), plasma display, or a liquid crystal display (LCD), for displaying information to a system administrator or user of the computer platform 2001. An input device 2010, including alphanumeric and other keys, is coupled to bus 2001 for communicating information and command selections to processor 2005. Another type of user input device is cursor control device 2011, such as a mouse, a trackball, or cursor direction keys for communicating direction information and command selections to processor 2004 and for controlling cursor movement on display 2009. This input device typically has two degrees of freedom in two axes, a first axis (e.g., x) and a second axis (e.g., y), that allows the device to specify positions in a plane.

An external storage device 2012 may be connected to the computer platform 2001 via bus 2004 to provide an extra or removable storage capacity for the computer platform 2001. In an embodiment of the computer system 2000, the external removable storage device 2012 may be used to facilitate exchange of data with other computer systems.

The invention is related to the use of computer system 2000 for implementing the techniques described herein. In an embodiment, the inventive system may reside on a machine such as computer platform 2001. According to one embodiment of the invention, the techniques described herein are performed by computer system 2000 in response to processor 2005 executing one or more sequences of one or more instructions contained in the volatile memory 2006. Such instructions may be read into volatile memory 2006 from another computer-readable medium, such as persistent storage device 2008. Execution of the sequences of instructions contained in the volatile memory 2006 causes processor 2005 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2005 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 2008. Volatile media includes dynamic memory, such as volatile storage 2006. Transmission media includes coaxial cables, copper wire and fiber optics, including the wires that comprise data bus 2004. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 2005 for execution. For example, the instructions may initially be carried on a magnetic disk from a remote computer. Alternatively, a remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on the data bus 2004. The bus 2004 carries the data to the volatile storage 2006, from which processor 2005 retrieves and executes the instructions. The instructions received by the volatile memory 2006 may optionally be stored on persistent storage device 2008 either before or after execution by processor 2005. The instructions may also be downloaded into the computer platform 2001 via Internet using a variety of network data communication protocols well known in the art.

The computer platform 2001 also includes a communication interface, such as network interface card 2013 coupled to the data bus 2004. Communication interface 2013 provides a two-way data communication coupling to a network link 2014 that is connected to a local network 2015. For example, communication interface 2013 may be an integrated services digital network (ISDN) card or a modem to provide a data communication connection to a corresponding type of telephone line. As another example, communication interface 2013 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2013 sends and receives electrical, electromagnetic or optical signals that carry digital data streams representing various types of information.

Network link 2013 typically provides data communication through one or more networks to other network resources. For example, network link 2014 may provide a connection through local network 2015 to a host computer 2016, or a network storage/server 2017. Additionally or alternatively, the network link 2013 may connect through gateway/firewall 2017 to the wide-area or global network 2018, such as an Internet. Thus, the computer platform 2001 can access network resources located anywhere on the Internet 2018, such as a remote network storage/server 2019. On the other hand, the computer platform 2001 may also be accessed by clients located anywhere on the local area network 2015 and/or the Internet 2018. The network clients 2020 and 2021 may themselves be implemented based on the computer platform similar to the platform 2001.

Local network 2015 and the Internet 2018 both use electrical, electromagnetic or optical signals that carry digital data streams. The signals through the various networks and the signals on network link 2014 and through communication interface 2013, which carry the digital data to and from computer platform 2001, are exemplary forms of carrier waves transporting the information.

Computer platform 2001 can send messages and receive data, including program code, through the variety of network(s) including Internet 2018 and LAN 2015, network link 2014 and communication interface 2013. In the Internet example, when the system 2001 acts as a network server, it might transmit a requested code or data for an application program running on client(s) 2020 and/or 2021 through Internet 2018, gateway/firewall 2017, local area network 2015 and communication interface 2013. Similarly, it may receive code from other network resources.

The received code may be executed by processor 2005 as it is received, and/or stored in persistent or volatile storage devices 2008 and 2006, respectively, or other non-volatile storage for later execution. In this manner, computer system 2001 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system. It is intended that the specification and examples be considered as exemplary only, with a true scope and spirit of the invention being indicated by the following claims.

What is claimed is:

1. A method executed in a system comprising a backup server, an array controller and an agent on a host, the method comprising:
   a. the backup server preparing for a backup process in cooperation with the agent;
   b. the agent collecting information regarding target data for backup processing;
   c. the backup server issuing a command to define a time point of a snapshot with an indication of a target of the snapshot;
   d. the array controller receiving the command;
   e. the array controller specifying a target of the snapshot by referring the command;
   f. the array controller making a marker to take the snapshot based on the command;
   g. the array controller detecting the marker in updating a base volume with a journal;
   h. the array controller checking the information in the marker and performing the backup processing according to a type of the marker;
   i. if the type of the marker corresponds to a snapshot, performing the backup processing using the snapshot;
   j. if the type of the marker corresponds to quiescence, performing the backup processing using a quiescent image; and
   k. if the marker is of another type, performing a process intended by the marker,
   wherein the backup processing using the snapshot comprises:
      i. the array controller making snapshot of at least one base volume specified by the marker;
      ii. the array controller allowing to read and write from and to the snapshot volume;
      iii. the array controller notifying the status change of the snapshot and corresponding volume address to the backup server;
      iv. the backup server performing backup process by reading data from the snapshot and writing the data to a tape library; and
      v. backup software notifying the end of use of the snapshot and instructing release of the snapshot to the array controller.

2. A method executed in a system comprising a backup server, an array controller and an agent on a host, the method comprising:
   a. the backup server preparing for a backup process in cooperation with the agent;
   b. the agent collecting information regarding target data for backup processing;
   c. the backup server issuing a command to define a time point of a snapshot with an indication of a target of the snapshot;
   d. the array controller receiving the command;
   e. the array controller specifying a target of the snapshot by referring the command;
   f. The array controller making a marker to take the snapshot based on the command;
   g. the array controller detecting the marker in updating a base volume with a journal;
   h. the array controller checking the information in the marker and performing the backup processing according to a type of the marker;
   i. if the type of the marker corresponds to the snapshot, performing the backup process using the snapshot;
   j. if the type of the marker corresponds to a quiescence, performing the backup processing using the quiescent image; and
   k. if the marker is of other type, performing a process intended by the marker,
   wherein the backup process using the quiescent image comprises:
      i. the array controller postponing updating the at least one base volumes by a journal to make the base volumes quiescent;
      ii. the array controller allowing to read and write from/to the base volumes;
      iii. the array controller notifying the status change of the quiescent base volume and their volume address to the backup server;
      iv. the backup server performing backup processing by reading data from the base volume and writing the data to a media library;
      v. backup software notifying the end of use of the base volume to the array controller; and
      vi. the array controller resuming updating the base volume by the journal.

* * * * *